Aug. 1, 1944.   R. R. MACHLETT   2,354,763
METHOD OF MAKING BEARINGS
Filed July 31, 1940
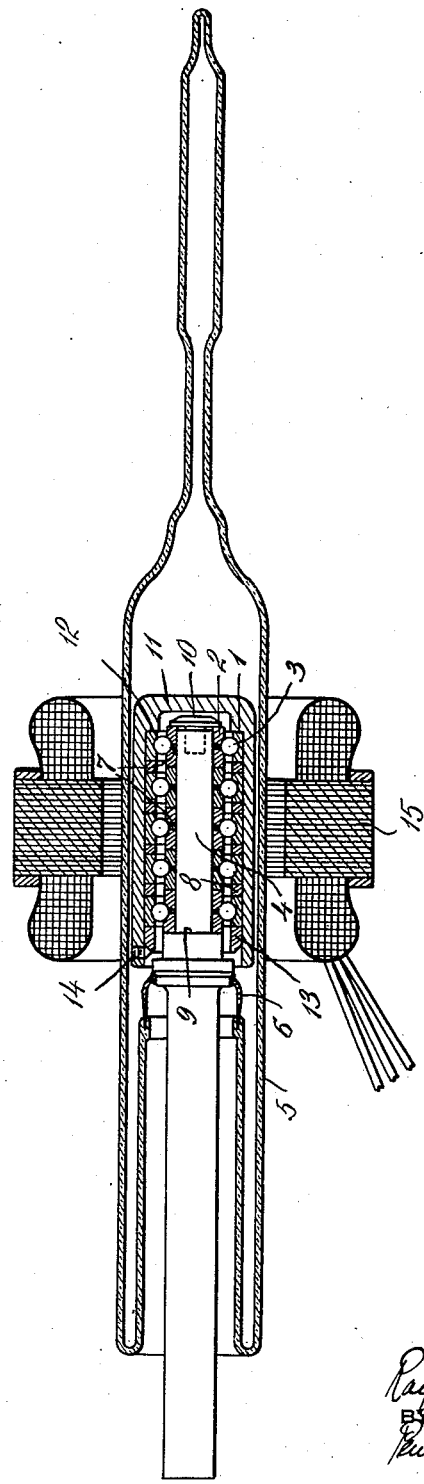
INVENTOR
Raymond R. Machlett
BY
ATTORNEYS Patented Aug. 1, 1944

2,354,763

UNITED STATES PATENT OFFICE 2,354,763

METHOD OF MAKING BEARINGS

Raymond R. Machlett, New Canaan, Conn., assignor to Machlett Laboratories, Inc., Springdale, Conn., a corporation of Connecticut Application July 31, 1940, Serial No. 349,021

2 Claims. (Cl. 117—131)

This invention relates to bearings suitable for use in an evacuated envelope, such as an X-ray tube, in which the bearings must operate without lubrication of the ordinary kind. More particularly, the invention is concerned with a novel method by which bearings giving excellent performance in the specified use may be conveniently and advantageously produced.

In the manufacture of vacuum tube apparatus in which a part is mounted for rotation within an evacuated envelope, the provision of suitable bearings for the part has heretofore presented serious difficulties. One reason for this is that ordinary lubricants cannot be employed within such an envelope because their vapor pressure is high and the presence of their vapors within the envelope interferes with the functioning of the apparatus. Accordingly, attempts have been made to solve the problem by using journal bearings of special materials and special lubricants of low vapor pressure, but these expedients have not been satisfactory.

It has also been proposed in the manufacture of rotary anode X-ray tubes to employ ball bearings in which the balls and races are made of alloy steels of great hardness, for example, steels containing tungsten, molybdenum, chromium, and similar alloying ingredients. Such ball bearings are intended to operate without lubrication of any kind, but although they are superior to journal bearings, they fall short of giving satisfactory results because the friction and noise in the bearings are undesirably great and the friction varies over a wide range under varying conditions of operation. The unsatisfactory performance of ball bearings as heretofore constructed, when employed in X-ray tubes, has undoubtedly arisen in part from the effects of the operation of degasifying the parts in the necessary processing of the tube.

If an ordinary ball bearing is run dry in the atmosphere, adhesion of points on the working surfaces in the course of time results in galling which may ultimately cause tearing of the metal. The change in the condition of the working surfaces of a bearing which has been subjected to outgassing causes high friction to develop in a short time, and in the case of a rotary anode X-ray tube in which the anode is rotated by an external field, the friction of the outgassed bearings may soon reach so high a value that the field normally employed is incapable of effecting rotation of the rotor. If the bearing is then exposed to the atmosphere so that it can reabsorb gas, the friction is at once reduced and the field will rotate the rotor freely. At the same time the bearings show no appreciable wear. It is thus evident that the effect of the outgassing operation on such a bearing is quite different from that produced by galling when the bearing is run without a lubricant.

Observation has shown that when the working surfaces of a bearing which has been outgassed are formed of the same material, the most unfavorable results are obtained, and that improvement in operation occurs, if the working surfaces are of different materials. The best results appear to be obtained when the working surface of one member is made of hard metal and the working surface of the other member is provided with a thin film of a metallic substance which has a low affinity for the hard metal. The metallic substance should be softer than the hard metal and should also have a low vapor pressure, that is, a vapor pressure such that the substance will not migrate from the surface of the member to which it is applied during ordinary conditions of operation of the bearing. An example of a bearing which gives satisfactory performance under vacuum conditions, as, for example, in a rotary anode X-ray tube, is one in which the bearing members, in the form of races and balls running between them, are made of alloy steel and a thin film of silver is applied to the surfaces of the balls. A bearing of the type described is disclosed in co-pending application of Skehan and Agule, Serial No. 260,884, filed March 10, 1939, which matured into Patent No. 2,315,280 on March 30, 1943, and the present invention is directed to the provision of a method by which a film of a metallic substance may be applied to the working surface of one of the bearing members, the substance having the characteristics above set forth.

In the practice of the new method, the bearing members are mounted in assembled relation in an envelope and are then outgassed by being heated while the interior of the envelope is connected to a vacuum pump. The bearing is then run with the member on which the film is to be applied making contact with a body of the material of which the film is to be formed. The material used for the film is one having the characteristics above mentioned, that is, it is of low affinity for the material forming the working surface of the second bearing member, softer than that material, and of sufficiently low vapor pressure to withstand ordinary conditions of operation. In the case of bearing members having working surfaces of steel, the metallic coating substance may be fine silver. This operation is continued until the member picks up a layer of the film material which is sufficient to produce the desired effect. The bearing is then removed from the envelope and is in condition for installation in the evacuated envelope in which it is to be finally employed.

For better understanding of the invention, reference may be had to the accompanying drawing in which the single figure illustrates the new apparatus by which the new method may be practiced.

The bearing shown in the drawing comprises an outer race 1, which is unitary and is formed with a channel in its inner face constituting the working surface, and a split inner race 2, the component parts of which are channeled on their outer surfaces to form a working surface. Between the races and running in the channels is a group of balls 3, and the balls and races are preferably made of a hard material, such, for example, as one of the so-called self-hardening tool steels.

In producing the bearing, the races and balls are made and assembled in accordance with standard practice and a plurality of the bearings are mounted within an envelope so that they may be simultaneously degassed and the films applied to the balls. For this purpose, the bearings are mounted side by side on a shank 4, sealed through the wall of a glass envelope 5 by a conventional seal 6. Before the inner races are placed in position, a thin shim 7 of the film material, for example fine silver, is inserted between the component parts of each inner race, the shim having an outer diameter such that its outer edge is exposed at the working surface of the channel in the inner race. In the construction illustrated, the inner races have a somewhat greater width than the outer races and the outer races are accordingly separated by spacers 8. The inner race at one end of the group bears against a shoulder 9 formed on the shank 4 and the races are held in place by a screw 10 threaded into the end of the shank and bearing against the inner race at the other end of the group. A metal sleeve 11 is then telescoped over the shank and the bearings until a shoulder 12 at one end of the sleeve bears against the outer race near the end of the shank. A spacer ring 13 lies at the other end of the group of bearings and a screw 14 threaded into a bore in the wall of the sleeve bears against the spacer 13 and holds the outer races in place.

With the bearings thus assembled, a stator coil 15 is slipped over the envelope and the interior of the envelope is connected to a vacuum pump in the usual way. With the pump operating, the entire assembly is heated by high frequency induction to a high temperature, for example just under 1000° F., and the temperature is maintained and the pumping continued until gas evolution has ceased. The envelope is then sealed off from the vacuum system and operated for several hours with the stator in a horizontal position. As the sleeve is rotated by currents induced therein by the stator coil, the outgassed balls of each bearing run in contact with the shim lying between the parts of the inner race of the bearing and, as a result, the balls pick up a thin film of the material of which the shim is made. By continuing the operation, a film of adequate thickness is finally produced and, by reason of the manner of its application, the film is tenaciously adherent and appears to be uniform.

When the application of the film has been completed, the rotor and bearings are removed from the envelope and the balls and the races previously used and from which the shims have been removed, may be assembled to form bearings suitable for installation in vacuum tube apparatus, or the balls may be employed with other races of appropriate form, if desired. When the vacuum tube apparatus, such as the X-ray tube, has been completed, the final operation is that of outgassing, and by careful control of time and temperature during that operation, that process can be prevented from detrimentally affecting the films on the balls. Rotating anode X-ray tubes containing bearings produced in the manner described have been successfully operated for extended periods, and the presence of the films on the balls in the bearing enables the bearing to operate with low friction and little noise.

I claim:

1. A method of making a bearing including races and rolling elements between the races, the races having working surfaces formed of a material for which silver has a low affinity, which comprises mounting the races and elements assembled in operative relation within an envelope, outgassing the surfaces of the races and rolling elements by simultaneously heating the races and elements and evacuating the envelope, thereafter, while the vacuum is maintained, causing the elements to roll on the races with the working surfaces of the elements in direct and continuous contact with a body of silver, continuing the movement of the elements in contact with said body only until the elements take up thin films of silver on their working surfaces, and thereafter removing the elements from contact with said body of silver.

2. A method of making a bearing including races and rolling elements between the races, the races and elements having working surfaces formed of a hard ferrous alloy, which comprises mounting the races and elements assembled in operative relation within an envelope, outgassing the surfaces of the races and elements by simultaneously heating the races and elements and evacuating the envelope, and thereafter, while the vacuum is maintained, causing the elements to roll on the races with the working surfaces of the elements in direct and continuous contact with a body of silver, continuing the movement of the elements in contact with said body only until the elements take up thin films of silver on their working surfaces, and thereafter removing the elements from contact with said body of silver.

RAYMOND R. MACHLETT.